United States Patent [19]

Mumford

[11] 4,274,859
[45] Jun. 23, 1981

[54] PLUNGER OPERATING MECHANISM FOR A GLASS FORMING MACHINE

[75] Inventor: Eustace H. Mumford, Ottawa Lake, Mich.

[73] Assignee: Owens-Illinois, Inc., Toledo, Ohio

[21] Appl. No.: 122,409

[22] Filed: Feb. 19, 1980

[51] Int. Cl.³ .............................................. C03B 11/16
[52] U.S. Cl. ..................................... 65/314; 65/305; 65/318
[58] Field of Search ........................... 65/305, 314, 318

[56] References Cited

U.S. PATENT DOCUMENTS

| | | | |
|---|---|---|---|
| 2,146,346 | 2/1939 | Nelson | 65/314 |
| 2,289,046 | 7/1942 | Rowe | |
| 3,024,571 | 3/1962 | Abbott et al. | |
| 3,185,560 | 5/1965 | Wilcock | 65/314 |
| 3,607,206 | 9/1971 | Foster et al. | 65/318 |

Primary Examiner—Arthur D. Kellogg
Attorney, Agent, or Firm—D. T. Innis; M. E. Click; D. H. Wilson

[57] ABSTRACT

In the operation of a pressing plunger for forming a parison from a gob of molten glass, it is important that the plunger be moved into the gob which is retained in the parison mold, with a fairly rapid motion and also be capable of being withdrawn from the formed parison as rapidly as possible. One other consideration is that it not be pressing the glass at the final portion of its travel at a very high force. By providing a large piston for moving the plunger into and out of pressing position, it is possible to move the plunger at a relatively high velocity with high operating pressure. A small piston is provided within the larger piston and by reason of having a substantially smaller surface area, with the smaller piston being connected to the plunger, a lower force is applied to the plunger. The plunger with its piston is moved by the larger piston to the fullest extent of the large piston's travel, and the smaller piston to which the plunger is attached is free to move relative to the large piston. This relative movement may occur at the final pressing position of the plunger. At this time, the pressure which is exerted on the smaller piston is the same as that which is exerted on the large piston, since the two are built coaxially of each other and are exposed to the same cylinder pressure. The force of the smaller piston will be substantially less due to the difference in the area of the smaller piston. This results in a significantly lower force being applied to the plunger at the time that it is meeting the greatest resistance to its movement. In this manner, the plunger may be initially positioned at high speed, then be finally positioned with fairly low force and then retracted or removed at a relatively high speed with the use of a single high pressure source of air.

9 Claims, 2 Drawing Figures

PLUNGER OPERATING MECHANISM FOR A GLASS FORMING MACHINE

BACKGROUND OF THE INVENTION

This invention relates to a glass forming machine of the press and blow type in which a charge of molten glass is delivered through the open upper end of a parison mold. The neck or finish portion of the mold is located at the bottom end of the parison mold. When the charge of glass is dropped into the mold through the open upper end, the top of the pressing plunger which is to be used to form the glass to the internal shape of the parison mold, is positioned at or adjacent the neck mold. When the charge has been delivered to the parison mold, a baffle will be seated over the top to close off the upper open end of the parison mold. The plunger is then moved vertically upward and by displacement of the glass, the charge will form a hollow parison having the neck portion thereof formed within the lower neck mold. Upon completion of the formation of the parison, the plunger is retracted downwardly out of the interior of the parison and the baffle will be removed from the parison mold. The parison mold will then open, permitting transfer of the parison from the parison mold to a blow mold where the parison will be expanded into its final container shape.

The plungers used to form the interior of the parisons are generally categorized into either narrow-neck or wide-mouth. This characterization actually relates to the diameter of the neck of the container to be formed in relation to its height and volume. A good example of a wide-mouth bottle or jar would be a baby food jar, while a good example of a narrow-neck bottle would be a beer or beverage bottle.

U.S. Pat. No. 2,289,046 issued to G. E. Rowe describes what is termed an "I.S. Machine" and the three modes of its operation, with the most pertinent for the present disclosure being that shown on sheet 6 of the drawings accompanying this patent, in which a narrow-neck plunger operation is illustrated and the cycle of operation of the narrow-neck press and blow bottle forming cycle is shown.

An example of a wide-mouth press and blow operation is that of U.S. Pat. No. 3,024,571 issued to Abbott et al., and commonly assigned with the present case. In the Abbott et al., patent, the parison mold is described as being a one-piece mold, in that it is not split down the center; however, this is a practice which may be carried out when the parisons are of a wide-mouth type, since the mold may be stripped vertically upward off of the parison as it is held by a neck mold. In a narrow-neck parison forming situation, such as that specifically illustrated in this case, it is necessary that the parison mold be vertically split so that the two halves can be parted freeing the parison for inversion and transfer to a blow mold by the neck and neck mold thereof.

In the operation of a plunger mechanism for moving the plungers in and out of pressing position relative to a parison mold, it has been the practice in the past to use dual pneumatic motors such as that shown in Abbott et al., in FIG. 12, fluid under pressure being fed to the cylinders beneath the pistons thereof to advance the plungers into upward pressing position and upon retraction, air under pressure or fluid under pressure is introduced to the upper ends of the cylinders to reverse the movement of the plungers.

It was found necessary to have dual pistons in order to provide sufficient speed so as to perform the pressing function within the confines of the time element permitted for the formation of the parisons. It should be kept in mind that glass forming machines, such as those described above and termed "I.S. Machines" or "Individual Section Machines" have all of the functions of the machine timed and programmed into a repeating cycle. In order to move the plunger upward into pressing position in a short period of time, it was found necessary to increase the size of the piston or when space would not permit, such as when plural parisons are being formed, it was necessary to provide dual pistons of smaller diameter to effect the same speed of pressing and a consequent increase in force would result.

When considering narrow-neck pressing, such as that illustrated, it has been found desirable that these plungers which are relatively long and slim be operated at low pressing pressure in order to get the required low pressing force. However, when operating at low pressure, the motors that are used will operate at relatively slow speed. Once the parisons have been formed, the plunger is to be retracted with the most expeditious movement possible.

SUMMARY OF THE INVENTION

It is an object of this invention to provide apparatus for pressing parisons wherein the plunger is connected to a piston rod and pressure which is carried within the piston and rod of a larger air cylinder. In the pressing of parisons by utilization of a small diameter piston being carried within a larger diameter piston, it is possible to move the piston assembly at relatively high speed under high pressure, while at the same time the pressing force given to the plunger by the smaller diameter piston even exposed to the same high pressure will result in a lower pressing force.

DETAILED DESCRIPTION OF THE DRAWINGS

Figure 1:
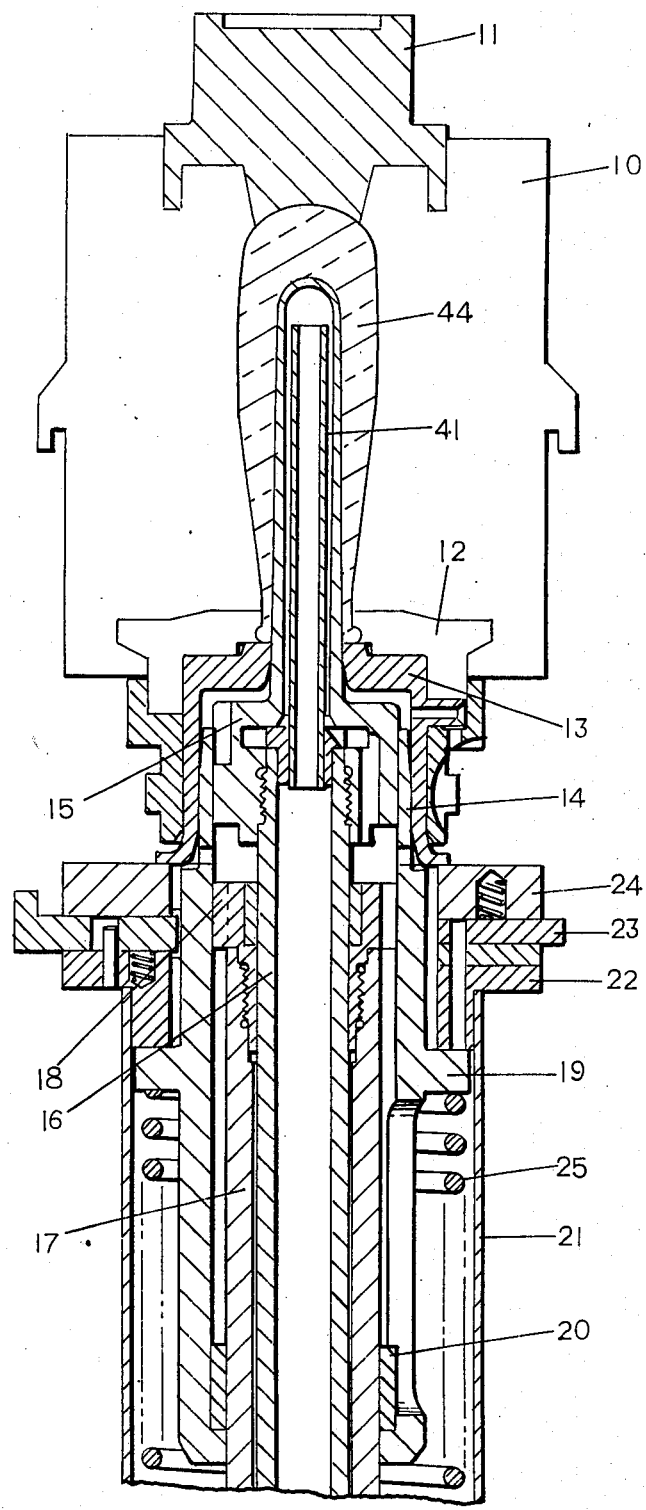
FIG. 1 is a vertical, cross-sectional view through the upper portion of a parison forming station of a glass forming apparatus.

With reference to the drawings, a parison mold 10, one-half of which is shown in FIG. 1, is illustrated as having a baffle 11 closing the upper end thereof and a neck mold 12 positioned within the lower end of the parison mold. An annular thimble or guide ring 13 is shown positioned within the neck mold 12 and the upper end of a guide tube 14 is shown positioned within the guide ring or thimble 13. Within the guide tube 14, there is positioned a plunger 15 which is threaded to the upper end of an elongated tube or annular rod 16. The plunger is guided for movement in a vertical, reciprocating motion by the tube 14. The tube or rod 16 in turn is coaxially positioned within a tube or annular piston rod 17. The upper end of the piston rod 17 has an enlarged annular cap 18 connected thereto which is adapted to be guided by and ride within the bore of the guide tube 14. The guide tube 14 has an annular flange portion 19 intermediate its length, that extends outwardly beyond the general outer diameter of the tube 14. The lower end of the tube 14 generally embraces the piston rod 17 and also serves to carry a spacer sleeve 20.

Figure 2:
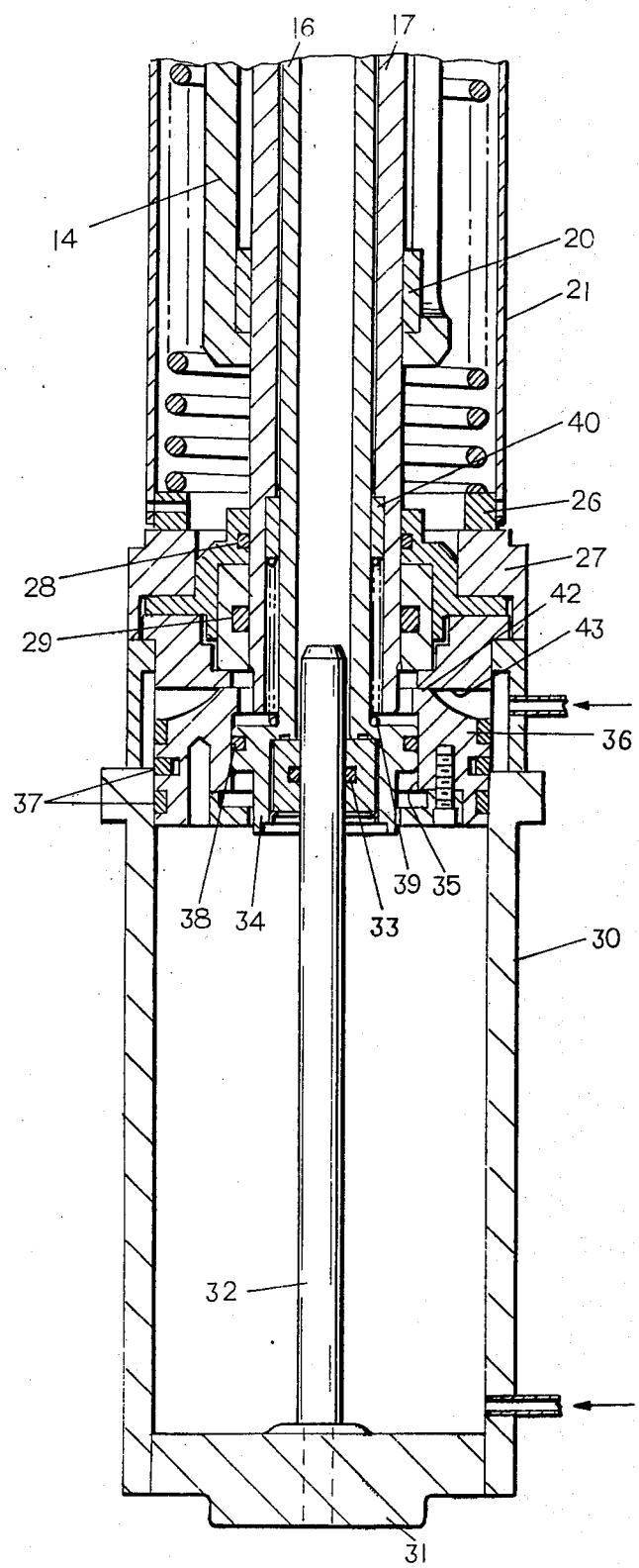
FIG. 2 is a vertical cross-sectional view of the lower portion of the apparatus illustrated in FIG. 1.

The guide tube 14 is surrounded by a cylindrical housing 21 whose upper end carries a stationary flange 22. The flange 22 and the superimposed annular members 23 and 24 are a stationary structure and provide a permanent upper reference level and serve as a stop for the flange 19 of tube 14. The flange portion 19 of the guide tube 14 is biased upwardly by a helical spring 25, whose lower end is in contact with an annular ring 26 (See FIG. 2). The lower end of housing 21 is also fastened to the ring 26. Ring 26 in turn is positioned on the top of an upper cylinder head 27. The cylinder head 27 is provided with the usual O-ring seals 28, 29 which bear against the side of the piston rod 17. An elongated cylinder 30 is fastened to the lower side of the cylinder head 27 and is closed at its lower end by a lower head 31. Extending upwardly from the center of the lower head 31 is a tube 32 through which cooling air may be introduced into the interior of the rod or tube 16. The tube 32 is surrounded by a seal 33, with the seal 33 being carried within the confines of a first piston 34. The annular piston 34 is shown at the lower end of the rod or tube 16 and is positioned within a cylindrical opening 35 provided within a second piston 36. The piston 36 is provided with the usual seal 37 in the periphery thereof which provides sealing engagement between the piston 36 and the cylinder 30. Piston 36 is illustrated as being at the lower end of the annular rod 17. The first piston 34 is also provided with an O-ring 38 in its outer periphery which engages with the inner wall of opening 35 in the second piston 36, thus serving as the cylinder therefor. The opening 35 is of sufficient length so as to permit significant relative movement between the first and second pistons. A helical spring 39 acting between the upper surface of the first piston 34 and a sleeve bearing 40 carried within the rod 17 will normally maintain the piston 34 in its most downward position relative to the second piston 36, this, of course, occurring when pressure is not present against the piston 34. A cooling tube 41 (See FIG. 1) is mounted to the upper end of the rod 16 and extends within the interior of the plunger 15 and, along with tube 32, serves to convey cooling air to the interior of the plunger 15. This cooling air may exhaust from the interior of the plunger through openings provided in the base thereof and other suitable openings past the cap 18 permitting the exhaust of the cooling air into the interior of the housing 21 from which it may then be exhausted to atmosphere.

The specific illustration presented in the Figures is the position when the plunger is in its most upward and fully pressing position at which time high pressure air introduced into the cylinder 30 has moved the piston 36 to its upper limit where its upper surface 42 will have seated against a lower surface 43 of the cylinder head 27. When the plunger has moved into pressing relationship with respect to a charge of glass 44, it will continue to move until the force applied to the plunger by the smaller diameter piston 34 will be balanced by the resisting the movement of the plunger. The larger piston 36 is moved upwardly with high pressure air being introduced into the bottom of cylinder 30, and the plunger will enter the glass at relatively high speed to the end of its stroke. Resistance to movement of the plunger in the glass will manifest itself in a relative displacement of the smaller piston 34 with respect to the piston 36. As would be expected, since the smaller piston 34 is of significantly less diameter than the piston 36, the actual force being applied to the plunger 15 will be considerably less at the terminal portion of its travel than that which would be applied were the force being generated by the piston 36. In this manner, relatively fast operation of the plunger may occur, yet low force is applied to the plunger at final pressing. After the pressing has been completed, high pressure air will be fed to the upper end of the cylinder 30 resulting in rapid retraction of both pistons and the plunger 15. Thus it can be seen that final pressing of the parison is done at high pressure with low force. High pressure may be used to position the plunger prior to final press and also be used in order to have high speed retraction. The force on the plunger will be the product of the small piston area and the pressure introduced within the cylinder 30. When the parison is fully pressed, the small piston 34 will, in effect, stop moving while the large piston will complete its stroke. The small piston, to which the plunger is directly connected, in effect, will arrive at a standstill.

While the foregoing description relates to the operation of a single plunger cylinder mechanism, it should be apparent that the principles of the invention will apply equally well to multiple plunger cylinders where plural containers are being made simultaneously on a press and blow type glass forming machine.

I claim:

1. Apparatus for pressing mold charges into parisons wherein the mold charge is delivered to a parison and a baffle is seated on the upper end of the mold and a neck ring carried at the lower end of the mold with a coaxially positioned plunger supported for axial movement through said neck ring into the interior of the parison mold by operation of a reciprocating motor, the improvement in the plunger operating motor comprising:

a first piston;
   a rod connected to said first piston;
   a second piston;
   a hollow rod connected to said second piston;
   said first piston positioned within a first cylinder formed in said second piston;
   said rod being coaxial with respect to said hollow rod and said plunger mounted to said rod;
   a second cylinder surrounding said second piston whereby high pressure fluid introduced to said second cylinder will move both pistons resulting in the plunger moving into the mold charge with a lower force.

2. The apparatus of claim 1 wherein said second piston is driven to the extremes of said second cylinder, said first piston being movable relative to said second piston, and means biasing said first piston toward its lowermost position relative to the first cylinder.

3. The apparatus of claim 2 further including spring means biasing said second piston toward the open end of said recess in said first piston.

4. Apparatus for pressing mold charges into parisons wherein a parison mold and neck ring combination with a baffle seated on the upper end of the mold has a coaxially positioned plunger supported for axial movement through said neck ring into the interior of the parison mold by operation of a reciprocating fluid motor, the improvement in the plunger operating motor comprising:

a first piston;
   a rod connected to said first piston;
   said plunger mounted to said rod;
   a second piston;
   a first cylinder formed in said second piston;
   a hollow rod connected to said second piston;

said first piston positioned within said first cylinder;
said rod extending coaxially within said hollow rod;
a second cylinder surrounding said second piston whereby high pressure fluid introduced to said second cylinder will actuate both pistons and move the plunger into the mold charge;
said second piston reaching a stop position before the plunger has fully pressed the charge;
said first piston moving relative to said second piston whereby the plunger is finally positioned in the glass with a lower force.

5. The apparatus of claim 4 wherein said second piston is driven to the extremes of said second cylinder, said first piston being movable relative to said second piston, and means biasing said first piston toward its lower-most position relative to the first cylinder.

6. The apparatus of claim 5 further including spring means biasing said second piston toward the open end of said recess in said first piston.

7. The apparatus of claim 4 further including a cylindrical guide surrounding said second annular piston rod adjacent its upper end and spring means biasing said guide in one direction.

8. The apparatus of claim 7 further including a fixed sleeve surrounding said cylindrical guide.

9. In apparatus for forming glass containers wherein a glass charge is formed into a parison by pressing a plunger into the charge confined in a combined parison and neck mold, the improvement in the plunger operating mechanism comprising:
a first piston;
a first hollow piston rod connected to said first piston;
a second piston;
an internal, axially positioned recess in said second piston opening beneath said first piston;
said recess in said second piston constituting a first cylinder;
said first piston being mounted in said first cylinder;
a second hollow piston rod connected to said second piston and extending coaxially about said first hollow rod;
a second cylinder surrounding said second piston;
an elongated plunger connected to the extending end of said first rod, whereby high pressure fluid introduced into said second cylinder will result in both pistons moving together in the retracting direction relative to said plunger at high speed and in the pressing direction with high force on the larger piston but lower force acting through the smaller piston connected to the plunger.

* * * * *